United States Patent Office 3,478,005
Patented Nov. 11, 1969

3,478,005
TERPENE COPOLYMERS
Harvey B. Wheeler, Pittsburgh, Pa., assignor to Neville Chemical Company, Pittsburgh, Pa., a corporation of Pennsylvania
No Drawing. Filed Apr. 27, 1966, Ser. No. 545,569
Int. Cl. C08f 15/40, 15/04
U.S. Cl. 260—80.7                        6 Claims

ABSTRACT OF THE DISCLOSURE

A light colored resin, made by polymerizing a mixture of hydrocarbon monomers containing principally alpha-pinene and a conjugated aliphatic $C_5$ diolefin and also from about 2 to not more than about 20 weight percent (based on total polymerizables) of cyclopentadiene, is an excellent tackifier for rubbery elastomers and useful in the formulation of pressure sensitive adhesives.

---

This invention relates to resins made by copolymerizing a terpene, especially alpha-pinene or a terpene feedstock rich in alpha-pinene, and a conjugated $C_5$ diolefin feedstock, especially an olefinic hydrocarbon fraction rich in isoprene or piperylene and at least a small amount of cyclopentadiene. More particularly, it relates to such resins which have light color, a softening point in excess of 100° C. and are suitable for use as tackifier resins in pressure sensitive adhesives. The invention also relates to a process for making this kind of resin in high yields from economical feedstocks.

Pressure sensitive adhesives, such as those used in making adhesive tapes, generally contain a combination of at least two principal components. One of these is a rubbery elastomer such as natural rubber or a synthetic rubber such as SBR, and the other is a tackifier or tack imparting material. The tackifier imparts adhesive strength to the adhesive which permits it to attach itself firmly to a substrate upon application of pressure whereas the rubbery material imparts cohesive strength which permits the adhesive to be cleanly stripped from the substrate surface to which it has been adhered.

Beta-pinene polymers have heretofore constituted a particularly effective tackifier for pressure sensitive adhesives but such polymers have been relatively expensive and beta-pinene has been increasing in price because of the growth of other uses and limited availability. Much effort has heretofore gone into the development of substitute materials by polymerizing or copolymerizing various terpenes with various unsaturated compounds. However, these efforts have been far from completely satisfactory. In some instances, as when alpha-pinene is copolymerized with bicycloheptadiene as taught in U.S. Patent 3,058,964 (Samour), a good tackifier is produced but its cost makes it unattractive. In other instances, terpenes such as turpentine fractions rich in alpha-pinene have been copolymerized with relatively inexpensive diolefins such as vinyl cyclohexene as disclosed in U.S. Patent 2,568,216 (Burroughs) but resin yields have generally tended to be low. Moreover, especially when impure feedstocks were used, the products tended to be of unsatisfactory quality in terms of adhesive strength, color, or softening point. Copolymerization of a terpene such as alpha- or beta-pinene with a diolefin such as butadiene is also taught in U.S. Patent 2,487,898 (Rummelsburg), using a halogenated solvent. Here again, however, either a relatively low melting resin or only a low yield of a high melting resin tends to be produced, especially when alpha-pinene is used as the terpene monomer.

It is an object of this invention to provide economical, high quality tackifier resins by copolymerizing a terpene such as alpha-pinene with a conjugated aliphatic $C_5$ diolefin feed. Another object is to provide an improved process for making such high quality resins in high yields. These as well as other objects will become more clearly apparent from the following description.

In accordance with this invention excellent yields of high quality tackifier resins can be obtained by the copolymerization of a resin-forming terpene feedstock such as alpha-pinene with a conjugated $C_5$ diolefin feedstock such as a cracked petroleum fraction which consists essentially of $C_5$ hydrocarbons and contains at least 20 or 30% and to about 98% by weight of a conjugated aliphatic diolefin such as isoprene or piperylene or a mixture of such diolefins and which further contains a minor proportion of cyclopentadiene. The cyclopentadiene when present in the reaction mixture in a concentration of from between about 2% to about 18 or 20% based on total polymerizable content of the feed, seems to be beneficial in increasing the softening point of the polymeric product. However, it has been found necessary to keep its concentration in the polymerizable feed mixture at 20% or less as otherwise an undesirably dark product tends to be produced.

Alpha-piene, though it gives notoriously low resin yields and softening points when polymerized by itself, is the preferred terpene used in the present invention. It can be used in any of its commercially available forms such as gum spirits of turpentine or refined sulfate wood turpentine. Such commercial turpentines commonly contain at least 60% alpha-pinene and are available in forms which contain more than 80% alpha-pinene, the balance being principally beta-pinene. Most preferably, the pinene feedstock used herein contains at least 85% alpha-pinene. A particularly good feedstock is commercial alpha-pinene containing about 90 to 99% alpha-pinene, about 1 to 6% beta-pinene and 0 to about 4% of associated monocyclic or bicyclic terpenes such as camphene. It distills within the range of 150° to 160° C. (vapor temperature) and has an aniline point by the standard ASTM D-611 method of about 46° C. Beta-pinene may also be used in the present invention to make copolymerized tackifier resins of good quality which are less costly than the conventional beta-pinene homopolymers.

To make the desired resins the polymerizable monomers are mixed in a mole ratio of between about 0.2 and about 5 moles of terpene per mole of total polymerizable conjugated $C_5$ diolefin, preferably about 0.4 and 1 mole of terpene per mole of total polymerizable conjugated $C_5$ diolefin. Expressed on a weight basis, suitable reaction mixtures may contain between about 0.3 and 7 parts, preferably between about 0.7 and 2.0 parts of pinene per part of total polymerizable conjugated $C_5$ diolefin.

In addition to the conjugated aliphatic and cyclic $C_5$ diolefins and the terpene the reaction mixture may also contain a minor amount of some other ethylenically unsaturated polymerizable compound such as a vinyl aromatic. For instance, good resins can be obtained from feed mixtures containing from about 7 to about 20 or 30% based on total polymerizable monomers of styrene, vinyl toluene, α-methyl styrene or similar polymerizable vinyl benzene. Alphamethyl styrene is particularly beneficial where compatibility with other resins such as ethylene-vinyl acetate copolymers is desired.

In carrying out the present invention, it is desirable to dilute the unsaturated monomers with an inert diluent such as benzene before they are polymerized. About 30 to 120 parts, preferably 40 to 75 parts, of benzene per 100 parts of total polymerizable monomers is used. Using a relatively concentrated solution of monomers is advantageous in letting the polymerization go near completion while producing a relatively high melting resin at a relatively low reaction temperature. However, in the absence of a diluent the polymerization mixture forms a solution which is too thick for adequate heat transfer. On the other hand, too much dilution should be avoided because it causes the conversion of the polymerizable content to polymer to fall off. This loss cannot be completely resolved even if higher polymerization temperatures are used. The use of higher temperatures is desirably avoided because it tends to impair product color and softening point.

Polymerization is effected at a temperature between about 0° and 50° C., preferably between about 15° and 35° C., in the presence of a Friedel-Crafts metal catalyst, especially aluminum chloride or aluminum bromide. The catalyst is used in a proportion of between about 1 and 10% based on total polymerizable monomers, preferably between about 3 and 7%. For ease of addition, the catalyst can conveniently be made up as a liquid solution or dispersion in a portion of the diluent. Gradual addition of the catalyst or catalyst dispersion to the combined diluent and polymerizable monomers while maintaining the reaction mixture within the desired temperature range is preferred because this tends to produce a higher melting resin than if the monomers are added to a solution or mixture of the catalyst in the liquid diluent under otherwise similar conditions.

A $C_6$–$C_8$ aromatic hydrocarbon can be used as the diluent for the reaction. Benzene is particularly preferred because it gives a higher melting resin than toluene or xylene. The inert hydrocarbon diluent is used in a proportion of between about 30 to 120 parts per 100 parts of polymerizable monomers, preferably about 40 to 75 parts per 100.

The reaction mixture containing the polymerizable monomers, diluent and catalyst is usually maintained at the selected reaction temperature until the desired degree of polymerization is reached. Maximum yields of desired resin are usually obtained after a residence time of about 1 to 10 hours, about 30 to 4 hours frequently being sufficient. Faster reaction can be obtained by operating at higher temperatures but this tends to give a darker product and lower soft point. Reaction temperatures below about 35° C. are therefore preferred. Though the reaction is strongly exothermic especially in its initial stages, temperature control can be easily maintained even in large scale runs by adding the catalyst to the reaction mixtures at an appropriate rate and by employing an externally refrigerated reaction vessel as and when necessary.

When the desired degree of polymerization has been reached the wanted product can be recovered from the reaction mixture in any convenient manner. For instance, if the reaction mixture is too viscous to permit easy handling, it may be diluted with a supplemental amount of benzene or other hydrocarbon solvent, e.g., to reduce the polymer concentration in the reaction mixture to between about 40 and 60%, before the diluted mixture is neutralized, catalyst sludge decomposed and residual catalyst destroyed. The neutralization and catalyst decomposition can be effected by adding a dilute aqueous solution of a detergent to the polymerized reaction mixture and heating the mixed liquids at between about 50° and 75° C. until the aluminum chloride sludge has disappeared. Heating for about 5 to 30 minutes, e.g., 15 minutes, is usually sufficient. About 10 to 100 parts of aqueous detergent solution per 100 parts of polymerized oil solution can be used. For instance, alkyltrimethyl ammonium halide salts such as octadecyl trimethyl ammonium chloride have been found to be very satisfactory detergents for this purpose at very low concentrations. They are effective when included in the treating water in concentrations of between 0.01 and 1%, e.g., 0.2%. Many other known surface active agents can be similarly employed to facilitate catalyst removal from the polymerized oil.

After heating the mixed aqueous and polymerized oil solutions the aqueous phase is drained and the polymerized oil washed with another portion of the dilute aqueous detergent solution, and the aqueous phase again drained. Thereafter sufficient base such as an aqueous NaOH solution or a mixture of powdered lime and clay is added to the polymerized oil solution to neutralize it, the temperature raised again to about 60° or 70° C., and the neutralized oil phase separated. When a solid such as lime and clay are used for neutralization it can be removed from the oil solution by filtration. Thereafter the neutralized oil solution is heated to strip out the low boiling oils and solvent. The required stripping can be effected by first heating the polymerized oil to about 235° C. to distill off solvent and other relatively low boiling hydrocarbons and then steam distilling the residue at 240° to 245° C. until a 20:1 water:oil ratio is obtained upon condensing the distillate.

The stripped resin is then recovered as product and the steam distillate is dried and also retained. Unless otherwise noted, yields of resins and steam distillates are reported herein based on the total weight of the crude feedstocks charged to the reaction not including the diluent. Resins having a ring-and-ball softening point (ASTM E–28) of at least 100° C. and a resin color of not more than 1 on a standard coal tar resin color reference scale (not more than 10 Gardner—50% resin in toluene) are particularly preferred, though resins having a resin color of not more than 2 are also quite desirable in many applications.

The invention will now be further illustrated by specific examples. All amounts and proportions of materials in these examples, as well as in other parts of this specification, are expressed on a weight basis unless otherwise indicated.

Monomers

The commercial alpha-pinene used in this work consisted of 93.5 to 95% alpha-pinene, about 2.5 to 4% beta-pinene and a small amount of camphene.

It had a Gardner color rating of less than 1, a specific gravity at 15.6° C. of 0.860 to 0.864 and a refractive index at 25° C. of 1.463 to 1.464.

The refined sulfate wood turpentine used contained 85% alpha-pinene, 12% beta-pinene, as well as a small amount of other terpenes.

The cyclopentadiene used was obtained by cracking commercially available dicyclopentadiene and had a boiling point of 42° to 45° C.

The piperylene used was a commercial concentrate containing 31.4% t-piperylene, 19.9% c-piperylene, 1.8% isoprene, 5.7% cyclopentadiene, 0.2% 2-methyl butene-1 and lighter, 0.2% n-pentane, 0.6% t-pentene-2, 0.6% c-pentene-2, 8.8% 2-methylbutene-2, 1.4% 2,2-dimethylbutene, 13.5% cyclopentene, 5.3% cyclopentane, 5.2% methylpentane and 5.4% heavy ends.

The cracked $C_5$ hydrocarbon fraction had a Gardner color rating of less than 1, a specific gravity (60/60° F.) of 0.71 and a boiling range predominantly between 85° and 160° F. More specifically, its Engler distillation curve (ASTM D–850) typically showed an initial boiling point at about 85° F., 50% off at 100° F., and 90% off at 155° to 160° F. Its chemical composition was typically as follows:

COMPOSITION, WEIGHT PERCENT

Di-unsaturates:

| | |
|---|---|
| Isoprene | 24 |
| Cyclopentadiene | 23 |
| trans-1,3-pentadiene | 9 |
| cis-1,3-pentadiene | 5 |
| 1,4-pentadiene | 2 |
| Others | 2 |
| Total | 65 |

Mono-unsaturates:
    2-Me-1-butene _____ 5
    2-Me-2-butene _____ 4
    Cyclopentene _____ 4
    1-pentene _____ 3
    trans-2-pentene _____ 2
    cis-2-pentene _____ 1
    Others _____ 1
                                                   —
        Total _____ 20
Saturates:
    iso-Pentane _____ 6
    n-Pentane _____ 5
    2-Me-pentane _____ 2
    Cyclopentane _____ 1
    Others _____ 1
                                                   —
        Total _____ 15

Example I

In this example a resin was made by copolymerizing alpha-pinene with piperylene concentrate described earlier herein. This concentrate contained about 10% cyclopentadiene based on total diolefin present. To carry out this copolymerization a 1 liter, 3-neck flask was used which was equipped with a propeller stirrer, a thermometer and an addition funnel with an attached Dry Ice cold finger. 20 gms. of anh. $AlCl_3$ was added to 200 gms. benzene with vigorous agitation. A 15° C. temperature surge was observed upon addition of $AlCl_3$. 143 gms. (1 mole— assumed 136 M.W. for alpha-pinene at 95% purity) of commercial alpha-pinene and 252 gms. (2 moles— assumed 68 M.W. for diolefins at 95% purity) of piperylene concentrate was added to the $AlCl_3$/benzene mixture while maintaining the reaction temperature at 20–25° C. Monomer addition time was 20 min. The reaction mixture was highly exothermic during monomer addition and required almost continuous cooling with a Dry Ice/acetone bath. The reaction mixture turned quite dark and became extremely viscous.

The reaction temperature was maintained at 20–25° C. for a period of 4 hours after completion of monomer addition. Then 100 gms. xylene was added followed by 80 cc. of 0.2% solution of octadecyl trimethyl ammonium chloride ("Arquad") in water. The temperature surged to 40° C. upon addition of the aqueous detergent solution and was then raised to 60° C., agitated for 15 minutes and quantitatively transferred to a 2 liter separatory funnel. After settling overnight, the aqueous layer was drained and the reaction mixture treated with 40 gms. of a 50/50 lime/clay mixture at 60–65° C. and suction filtered. The polymerized oil was quantitatively transferred to a steam-down flask and distilled to 20/1 $H_2O$/oil ratio softening point. A good yield of excellent quality resin was obtained as indicated by the following results:

Resin yield, wt. percent _____ 75.4
R&B S.P., °C. at 20/1 _____ 118
Color, coal tar resin scale _____ ¾+

Following basically the same procedure, a series of runs was carried out employing different feedstocks and different process modifications as indicated in Table A.

Several significant conclusions can be drawn from the data shown in Table A. (Please refer to Table B for common footnotes.)

The control run (run 1) shows that alpha-pinene alone produces a relatively low yield (less than 50%) of a resin having a softening point of only about 84° C. By contrast, by copolymerizing alpha-pinene with the cracked $C_5$ fraction (run 2) a resin having a softening point of about 111° C. is produced in a yield of almost 70%. The cracked $C_5$ fraction used as feed, it will be recalled, contained about 23% cyclopentadiene resulting in about 10% cyclopentadiene being present in the total polymerizable monomers.

Runs 3 and 4 show that desirable products can also be obtained in accordance with this invention by including a minor amount of still other monomers such as a vinyl benzene (styrene or methyl styrene) in the feed. The product made from the feed mixture which included the alpha-methyl styrene was found to be particularly desirable because of its excellent compatibility with ethylene-vinyl acetate copolymer resins such as "Elvax."

TABLE A.—TERPENE COPOLYMERS

| | Run Number | | | | | | | |
|---|---|---|---|---|---|---|---|---|
| | 1 | 2 | 3 | 4 | 5 | 6 | 7 | 8 |
| Reactants, wt. percent: | | | | | | | | |
| Alpha-pinene (95%)[1] | 100 | 60 | 57.2 | 57.2 | 66.7 | 66.7 | 72.7 | 80 |
| Cracked $C_5$ Fraction (85%)[1] | | 40 | 28.6 | 28.6 | 33.3 | 33.3 | 18.2 | |
| Styrene (84%)[1] | | | 14.2 | | | | | |
| Cyclopentadiene (100%)[1] | | | | | | | 9.1 | 20 |
| Alpha-methyl Styrene (99%)[1] | | | | 14.2 | | | | |
| Total Wt. Reactants, pts.[6] | 100 | 100 | 100 | 100 | 100 | 100 | 100 | 100 |
| Diluent: | | | | | | | | |
| Xylene, pts | | | | | | 67 | 82 | 100 |
| Benzene, pts | 100 | 50 | 47.5 | 47.5 | 67 | | | |
| Reaction Conditions: | | | | | | | | |
| Catalyst | $AlCl_3$ | $AlCl_3$ | $AlCl_3$ | $AlCl_3$ | $AlCl_3$ | $AlCl_3$ | $AlCl_3$ | $AlCl_3$ |
| Weight Catalyst, pts | 5 | 5 | 4.8 | 4.8 | 4.2 | 4.2 | 4.5 | 5 |
| Reaction Temp., °C | 25±5 | 20–25 | 20–25 | 20–25 | 20–25 | 20–25 | 20–25 | 20–25 |
| Reactants added to catalyst | | | | | Yes | | Yes | Yes |
| Catalyst added to reactants | Yes | Yes | Yes | Yes | | Yes | | |
| Reactant addition time, min | | | | | 32 | | 23 | 25 |
| Catalyst addition time, min | 45 | 10 | 10 | 10 | | 5 | | |
| Reaction period, hrs | 2 | 3 | 3 | 3 | 2 | 3 | 3 | 3 |
| Steamdown: | | | | | | | | |
| Resin yield, wt. percent | 47.7 | 66.8 | 70.4 | 71.2 | 61.2 | 61.2 | 68.2 | 74.3 |
| Steam dist., wt. percent | 49.9 | 22.2 | 20.2 | 20.4 | 24.8 | 32.9 | 34.1 | 32.8 |
| Total | 97.6 | 89.0 | 90.6 | 91.6 | 86.0 | 94.1 | 102.3 | 107.1 |
| R&B, S.P., °C | 84 | 111 | 101 | 103 | 107 | 85 | 110 | 126 |
| Coal Tar Resin Color | ½+ | ¾+ | ¾+ | 1+ | 1¼+ | 1+ | 1½+ | 3½+ |
| $I_2$ No., Wijs method | 136 | 135 | 124 | 129 | | | 135 | 136 |
| Feed Composition: | | | | | | | | |
| Wt. percent Cyclopentadiene (based on polymerizeable content)[2] | | 10.1 | 7.1 | 7.3 | 8.4 | 8.4 | 14.2 | 20.4 |
| Mol Ratio (Pinene/conjugated $C_5$ diolefin)[3] | | 1.10 | 1.45 | 1.45 | 1.46 | 1.46 | 1.66 | 1.90 |
| Wt. Ratio (Pinene/conjugated $C_5$ diolefin)[4] | | 2.2 | 2.9 | 2.9 | 2.9 | 2.9 | 3.3 | 3.8 |
| Resin Composition, Wt. Percent Cyclopentadiene in Hard Resin[5] | | 13.7 | 9.4 | 9.3 | 12.6 | 12.6 | 19.6 | 27.1 |

[1] Figures in parenthesis are polymerizable content.
[2] 23% of Cracked $C_5$ Fraction plus 100% of the added Cyclopentadiene divided by sum of the polymerizable content of all the reactants listed (see footnote [1]).
[3] 95% of the pinene (MW=136) divided by sum of 65% of Cracked $C_5$ Fraction plus 100% of the added cyclopentadiene (MW=68).
[4] 95% of the pinene divided by sum of 65% of Cracked $C_5$ Fraction plus 100% of the added cyclopentadiene.
[5] Sum of 23% of Cracked $C_5$ Fraction plus 100% of the added Cyclopentadiene divided by the Resin Yield shown in this table, exclusive of Steam dist.
[6] Note that 200 parts/wt. are used in Table B compared to 100 parts in Table A.

Though not exactly comparable because of minor differences in feed composition, a comparison between runs 2 and 5 indicates that a higher melting resin is obtained when the catalyst is added to the premixed reactants than when the resins are added to the catalyst.

The softening points of the reactants obtained in runs 2, 5 and 6 further illustrate the substantial superiority of benzene over xylene as the reaction diluent. The relatively high yield of steam distillate in run 6 is believed to indicate that the xylene itself takes part in the polymerization reaction. Increasing the pinene/$C_5$ diolefin ratio tends to lower product softening point.

A comparison between runs 6 and 7 illustrates that sive adhesives was tested by using them as tackifiers in an otherwise conventional pressure-sensitive adhesive composition. In making such a composition, natural pale crepe rubber was milled on a rubber mill for 20 minutes (fast roll temperature 135° C., slow roll 130° F.) and then immediately compounded into adhesive on the following basis:

|  | Parts |
| --- | --- |
| Pale crepe | 100 |
| Tackifier | 67 |
| Antioxidant ("Aminox" diphenylamine-acetone condensation product) | 1 |
| Cyclohexane | 1,110 |

TABLE B.—TERPENE COPOLYMERS

|  | Run Number | | | | | |
| --- | --- | --- | --- | --- | --- | --- |
|  | 11 | 12 | 13 | 14 | 15 | 16 |
| Reactants, wt. pts.: | | | | | | |
| Alpha-pinene (95%)[1] | 114 | 79.6 | 93.6 | | | |
| Ref. Sulfate Wood Turps. (95%)[1] | | | | 113 | 78.8 | 92.6 |
| Cracked $C_5$ Fraction (85%)[1] | 86 | 120.4 | 106.4 | 87 | 121.2 | 107.4 |
| Total Wt. Reactants [3] | 200 | 200 | 200 | 200 | 200 | 200 |
| Diluent, Benzene, pts | 100 | 100 | 100 | 100 | 100 | 100 |
| Steam Down: | | | | | | |
| Resin Yield, wt. percent 20/1 | 71.1 | 80.2 | 77.5 | 78.7 | 79.8 | 75.8 |
| Steam Dist., wt. percent | 16.5 | 7.3 | 12.4 | 11.0 | 7.0 | 5.5 |
| Total Yield, wt. percent | 87.6 | 87.5 | 89.9 | 89.7 | 86.8 | 81.3 |
| R&B, S.P., ° C | 119 | 120 | 123 | 106 | 121 | 125 |
| Coal Tar Resin Color | 1¼+ | 1¼+ | 1½ | 1¼+ | 1¼+ | 1¼+ |
| Feed Composition: | | | | | | |
| Wt. Percent Cyclopentadiene (based on polymerizeable content)[2] | 10.9 | 15.6 | 13.7 | 11.0 | 15.8 | 13.8 |
| Mol Ratio (Pinene/conjugated $C_5$ diolefin)[3] | .97 | .48 | .64 | .95 | .47 | .63 |
| Wt. Ratio (Pinene/conjugated $C_5$ diolefin)[4] | 1.9 | .97 | 1.3 | 1.9 | .95 | 1.3 |
| Resin Composition, Wt. Percent Cyclopentadiene in Hard Resin [5] | 13.9 | 17.4 | 16.0 | 12.7 | 17.5 | 16.3 |

[1] Figures in parenthesis are polymerizable content.
[2] 23% of Cracked $C_5$ Fraction plus 100% of the added Cyclopentadiene divided by sum of the polymerizable content of all the reactants listed (see footnote [1]).
[3] 95% of the pinene (MW=136) divided by sum of 65% of Cracked $C_5$ Fraction plus 100% of the added cyclopentadiene (MW=68).
[4] 95% of the pinene divided by sum of 65% of Cracked $C_5$ Fraction plus 100% of the added cyclopentadiene.
[5] Sum of 23% of Cracked $C_5$ Fraction plus 100% of the added Cyclopentadiene divided by the Resin Yield shown in this table, exclusive of Steam dist.
[6] Note that 200 parts/wt. are used in Table B compared to 100 parts in Table A.

enrichment of the polymerization mixture with cyclopentadiene tends to increase yields as well as softening point of the resin but impairs its color. It should be noted that a higher resin yield and a higher melting resin were obtained in run 7 although the preferred technique of adding catalyst to the reactants was employed in run 6 whereas the less desirable reverse technique was employed in run 7. Run 8, using a reactant mixture consistnig of 80 parts alpha-pinene and 20 parts cyclopentadiene still further emphasizes the undesirable effect of cyclopentadiene on resin color when this diolefin is present in a concentration in excess of the upper limit of this invention. The resin made in run 8 had a deep color in excess of 3.

Almost equally good resins and resin yields are obtained when either high purity alpha-pinene or refined sulfate wood turpentine is copolymerized with the $C_5$ diolefin feedstock. The use of other terpenes such as dipentene in lieu of pinene is also possible.

The effect of varying the ratio of pinene to olefin in the reaction mixture is illustrated in the series of runs summarized in Table B.

Comparing this series of runs with those in Table A, it can be seen that unless the feed was enriched with added cyclopentadiene, resins with the highest softening points were obtained from reaction mixtures containing the reactants in a weight ratio of less than 2.0 parts of pinene per part of conjugated $C_5$ diolefin. The softening point averaged almost 20° lower when this weight ratio was increased into the range of from 2.0 to 3.5 parts of pinene per part conjugated $C_5$ diolefin. Also the best resin yield was obtained when the reaction mixture contained less than 2 parts of pinene per part of conjugated $C_5$ diolefin. Six runs (11–16) in this low (<2) pinene/conjugated $C_5$ diolefin weight ratio range averaged 77.2% yield versus 66.5% resin yield for six runs (2–7) in the higher (2.0–3.5) pinene/conjugated $C_5$ diolefin weight ratio range.

The effectiveness of the various resins in pressure sensi-

The samples were then placed on a paint shaker until solution was attained. Using a four inch draw knife set at 15 mils, films of adhesive solution were thereafter drawn on cellophane and allowed to dry for two hours. Finally, a release paper was laid down on the films and sample tape strips one inch wide and eight to ten inches long were cut.

The adhesive strength of the sample tape strips was determined using an Instron tensile test machine. Polished steel Q panels were cleaned with acetone to remove all grease. About three to four inches of the adhesive strip was then placed firmly on the plate after removing the release paper. The plate was placed in the lower, traveling jaw and the other end of the tape was clamped in a stationary jaw so that the tape was stripped off at an angle of 180°. With a traverse speed of twelve inches per minute and sensitivity set at 2, the tape is pulled off and two readings taken. One is reported as the "mean" and is the average pounds of force expended over the duration of the stripping of the tape. The other is reported as the "maximum" and is the maximum pull exerted on the sample during the stripping. Two to six samples were pulled on each adhesive formulation and the average of the readings computed. Each time adhesive tape samples were prepared and tested, strips prepared in the same manner using a commercial poly-beta-pinene resin as the tackifier were prepared and used as a standard of reference.

Resin 12 (Table B) proved to be a very good tackifier, producing about 85% of the adhesive strength resulting from the use of the standard poly-beta-pinene resin. Similar results of about 85% of the adhesive strength of the standard poly-beta-pinene resin were given by Resin 16 (Table B).

Resin 2 (Table A) also proved to be a good tackifier producing about 60 to 66% of the adhesive strength resulting from the use of the standard poly-beta-pinene resin. Particularly good results were obtained when this novel alpha-pinene copolymer resin was used as an extender for the standard poly-beta-pinene resin. Thus, a mixed tackifier resin consisting of 50% of this novel copolymer resin and 50% standard poly-beta-pinene resin gave an adhesive strength equal to about 95% of the strength given by the standard poly-beta-pinene. A mixed tackifier resin consisting of 25% of the novel copolymer resin and 75% of the standard poly-beta-pinene resin produced essentially, the same adhesive strength in the adhesive composition as the standard poly-beta-pinene resin alone.

The foregoing shows that excellent tackifier resins can be produced by copolymerizing pinene with a conjugated aliphatic $C_5$ diolefin or with a $C_5$ olefin fraction containing a substantial concentration of isoprene or piperylene or a mixture of such diolefins, a small amount of cyclopentadiene also being required in the polymerization mixture. The use of benzene as the reaction diluent is particularly beneficial.

The invention for which patent protection is desired is particularly pointed out in the appended claims.

What is claimed is:

1. A thermoplastic resin having a softening point of at least 100° C. and a color not darker than 10 Gardner, said resin being a copolymer of between about 0.3 and 7 parts of pinene per part of total polymerizable conjugated $C_5$ diolefin by weight, provided however that cyclopentadiene constitutes from between about 2% to about 20% by weight of total copolymer.

2. A resin according to claim 1 wherein said pinene is alpha-pinene and said diolefin comprises isoprene.

3. A resin according to claim 1 wherein said diolefin comprises piperylene.

4. A resin according to claim 1 which in addition to the combined $C_5$ diolefin and the combined pinene comprises between about 7 and about 30 weight percent of a combined vinyl benzene.

5. A resin according to claim 1 which comprises combined $C_5$ diolefin, combined alpha-pinene and between 7 and 20 weight percent of combined alpha-methyl styrene.

6. A thermoplastic resin according to claim 1 formed by copolymerizing a liquid mixture which comprises alpha-pinene and an unsaturated $C_5$ hydrocarbon fraction, said fraction containing isoprene, piperylene and cyclopentadiene, said cyclopentadiene being present in said mixture in a concentration of from about 6 to 18 weight percent based on total polymerizable monomers present in said mixture.

References Cited
UNITED STATES PATENTS

| | | | |
|---|---|---|---|
| 2,348,565 | 5/1944 | Ott | 260—80 |
| 2,626,940 | 1/1953 | Sparks et al. | 260—29.1 |
| 2,754,288 | 7/1956 | Banes et al. | 260—82 |
| 2,802,813 | 8/1957 | Maguire et al. | 260—93.3 |
| 2,932,631 | 4/1960 | Rummelsburg | 260—93.3 |
| 3,299,170 | 1/1967 | Gonzenbach | 260—846 |

JOSEPH L. SCHOFER, Primary Examiner

J. C. HAIGHT, Assistant Examiner

U.S. Cl X.R.

260—80.78